United States Patent [19]

Kanduth et al.

[11] Patent Number: 5,381,690
[45] Date of Patent: Jan. 17, 1995

[54] METHOD AND APPARATUS FOR MEASURING THREE DIMENSIONAL STRESS IN ROCK SURROUNDING A BOREHOLE

[75] Inventors: Harald H. Kanduth, Saint-Lazare; Marty Hudyma, Bathurst, both of Canada

[73] Assignee: Noranda Inc., Ontario, Canada

[21] Appl. No.: 28,913

[22] Filed: Mar. 8, 1993

[30] Foreign Application Priority Data

Mar. 9, 1992 [CA] Canada .................. 2062543

[51] Int. Cl.$^6$ .............. E21B 47/00; G01N 19/06; G01B 5/00
[52] U.S. Cl. ........................ 73/151; 73/155; 73/781; 73/783; 73/784
[58] Field of Search ............... 73/151, 155, 784, 782, 73/783, 781, 760

[56] References Cited

U.S. PATENT DOCUMENTS

| | | | |
|---|---|---|---|
| 4,491,022 | 1/1985 | de la Cruz | 73/783 |
| 4,813,278 | 3/1989 | Kosugi | 73/783 |
| 4,899,320 | 2/1990 | Hearn et al. | 73/151 |
| 5,113,707 | 5/1992 | Herget | 73/784 |

OTHER PUBLICATIONS

Prokhorov; "Strain measuring device and device for investigating strain distribution"; Ind. Lab. (USA), vol. 37(5), May 1971, 775-7.

Bock et al., "A new stress relief concept for in-situ stress measurements in rock and its implementation in two recoverable stressmeters", Proc. 4th Austr. N.Z. conf. on geomechanics, Perth, 1984.

Primary Examiner—Robert J. Warden
Assistant Examiner—Christopher Y. Kim
Attorney, Agent, or Firm—Keck, Mahin & Cate

[57] ABSTRACT

A method for measuring the three dimensional stress in rock surrounding a borehole comprises the steps of cutting slots into the wall of a borehole at different angles relative to the borehole axis so as to effect stress relaxation and strain deformations which are representative of the stresses normal to the angle of the respective slots, and measuring the respective strain deformations adjacent to the slots that are being cut into the borehole wall at a sufficient number of angles to satisfy the mathematical requirement of six independent equations to solve for the three dimensional stress tensors so as to determine the three dimensional stress field surrounding the borehole from measurements in a single borehole.

4 Claims, 3 Drawing Sheets

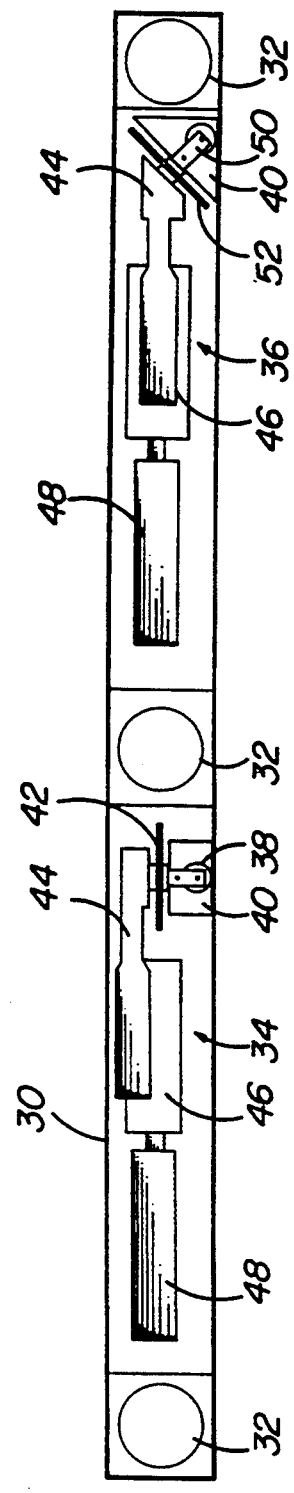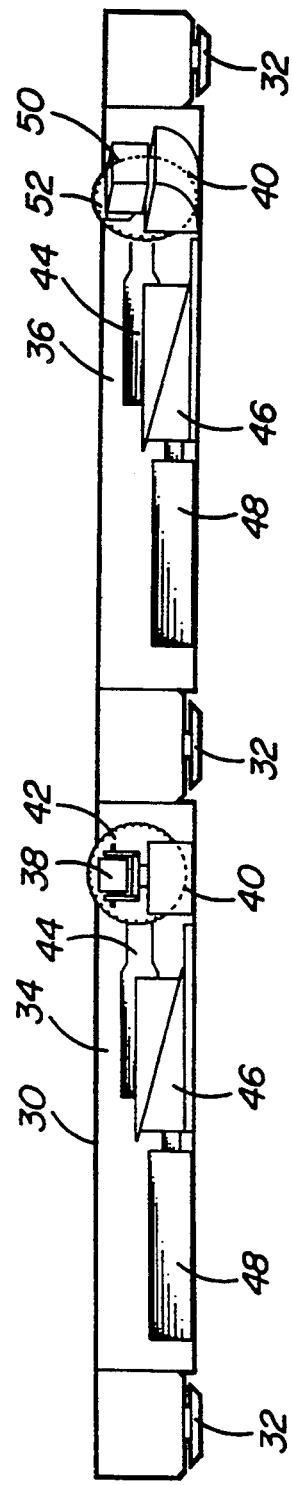
Fig. 3a
Fig. 3b

METHOD AND APPARATUS FOR MEASURING THREE DIMENSIONAL STRESS IN ROCK SURROUNDING A BOREHOLE

The invention relates to a method and an apparatus to measure three dimensional stress surrounding a borehole.

BACKGROUND AND PRIOR ART

The state of stress in rock plays an important role in the behaviour of the ground in response to the creation of underground openings such as found in mining operations or civil engineering projects. For the design of underground openings it is therefore essential that the pre-excavation in situ stress be either measured or estimated. The inability to measure or estimate satisfactorily the state of stress in many circumstances is one of the major impediments to the utility of many of the theoretical and mathematical models which have come into use for the design of underground excavations.

Stress is an intangible quantity which cannot be measured directly. It is only the manifestation of stress which is measured and used to estimate the stress. The most common methods employ stress relief or compensation techniques which result in strains which can be measured. By knowing the mechanical properties such as the modulus of elasticity and the Poisson's ratio of the rock in which the measurements were carried out one can deduce the in situ stress.

In most mining and civil engineering applications the in situ stress is measured with overcoring methods. These methods require the installation of a strain measuring device in a borehole and the subsequent drilling of an oversized hole over the existing hole to obtain an annulus which is stress relieved. The resultant strain is measured with the device inside the annulus. The stress regime can then be calculated from the strains measured as a result of the relaxation of the rock.

There are several different overcoring procedures and devices all of which have in common that they require the presence of a diamond drill throughout the testing procedure and, with the exception of the USBM gauge, the measuring devices cannot be recovered. As a consequence, these determinations are very costly and time consuming and can rarely be carried out on a routine basis.

Against this background a novel instrument was recently developed at James Cook University, Australia, which does not rely on overcoring methods and is fully recoverable. A full description of the method and associated apparatus is given by H. Bock et al in the Proceedings of the 4th Australian & New Zealand Conference on Geomechanics in Perth, Australia, 1984. The novel device is now manufactured and marketed by Interfels, Germany as the James Cook/Interfels Type 096 Borehole Slotter (hereinafter referred to as the Slotter). This is the instrument upon which the above invention is based and it is therefore described in more detail.

The Slotter works on the (St. Venant) principle that, when a crack or slot is created in the wall of a stressed borehole, virtually total stress relief will occur immediately adjacent and normal to the crack or slot. This results in a deformation of the rock which is controlled by the state of stress the rock was prior to the creation of the crack or slot as well as the mechanical properties of the rock material.

The Slotter is designed to cut, by means of a diamond saw blade, an axial slot into the sidewall of a borehole and to measure the tangential deformation of the rock caused by the resultant relaxation. The strain measurement is done with an integrated, specifically designed recoverable strain sensor. Repeated slots are cut around the circumference of the borehole wall and the deformation results are combined. To arrive at the two dimensional stress field normal to the axis of the borehole, the measured deformations, expressed in microstrains, which are a function of the stress acting perpendicular to the respective slots, and the physical properties such as the modulus of elasticity and the Poisson's Ratio of the rock mass, are used for a close form mathematical solution. To determine the three dimensional stress field in the rock mass, similar measurements are carried out in two additional, non-coplanar, non-coangular boreholes, and the results of three boreholes are combined by regression analysis.

Although the slotter is in many respects more efficient and cost effective than the overcoring methods, it has the disadvantage of needing three separate boreholes to determine the the three dimensional state of stress in a rock mass. In view of the cost of drilling the required "H" size (96-106 mm) diamond drill holes, which can be as high as $5,000 per hole, considerable savings could be realized if the number of boreholes required could be reduced. In addition, the time needed to carry out measurements could also be reduced substantially if the procedures would not have to be repeated in three different boreholes. Lastly, it is difficult to combine the results of three independent, diverging boreholes into a single three dimensional stress tensor, especially when the rock is anisotropic and structured, which may cause significant differences in local stress orientations and magnitudes.

It is therefore the object of the present invention to provide a method and an apparatus, based on the slotting principle, which would allow the determination of the three dimensional stress regime in rock i) in a single borehole, ii) without the requirement of an on-site diamond drill and iii) with a device that can be recovered and reused.

SUMMARY OF THE INVENTION

The method in accordance with the present invention for measuring three dimensional stress in rock surrounding a borehole comprises cutting slots into the wall of a borehole at different angles relative to the borehole axis so as to effect stress relaxation and strain deformations which are representative of the stresses normal to the angle of the respective slots and measuring the respective deformations adjacent to the slots that are being cut into the borehole wall at a sufficient number of angles to satisfy the mathematical requirement of six independent equations to solve for the three dimensional stress tensors so as to determine the three dimensional stress field surrounding the borehole from measurements in a single borehole.

Cutting of the slot is done by inserting into the borehole an instrument having a first device for cutting an axial slot in the wall of the borehole and a second device for cutting a second slot at an angle of about 45° to the axis of the borehole. Then after axial rotation of the instrument another slot is cut at about 325° relative to the axial slot and perpendicular to the former angular slot, thus creating a series of three slots of independent angles. In order to arrive at the minimum required number of angles, the three-angle cutting procedure is repeated at different axial borehole rotations, preferably but not exclusively, at the two rotational angles of 60°±10° and 120°±10° from the rotational angle of the first slot series.

The apparatus for carrying out the above method comprises a tubular main housing adapted to be inserted and maintained in position in a borehole during measurement, and two stress relief mechanisms mounted coaxially within the housing. The first one comprises a slot cutting device for cutting an axial slot into the borehole wall parallel to the borehole axis, a strain sensor assembly adapted to be located adjacent to the center of the slot to measure the deformation of the rock normal to the slot while the slot cutting is taking place, and means for moving the slot cutting device against the borehole wall. The second one comprises a slot cutting device for cutting a slot into the borehole wall at an angle of about 45° to the borehole axis, a strain sensor assembly adapted to be located adjacent to the center of the 45° slot to measure the deformation of the rock material normal to the 45° slot while the slot cutting is taking place, and means for moving the slot cutting device against the borehole wall.

BRIEF DESCRIPTION OF THE DRAWINGS

The invention will now be disclosed, by way of example, with reference to a preferred embodiment illustrated in the accompanying drawings in which:

FIGS. 3a and 3b are schematic diagrams illustrating top and side views, respectively, of an embodiment of an apparatus for measuring three dimensional stress in rock surrounding a borehole.

DESCRIPTION OF A PREFERRED EMBODIMENT

Figure 1A:
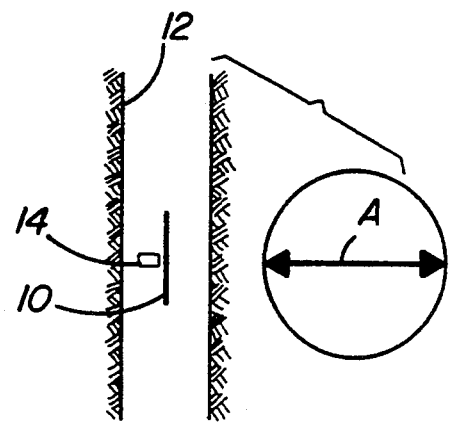
FIG. 1 is graphic representation of the stress relief orientations when slots are cut at different angles into the sidewall of a borehole.
Figure 1B:
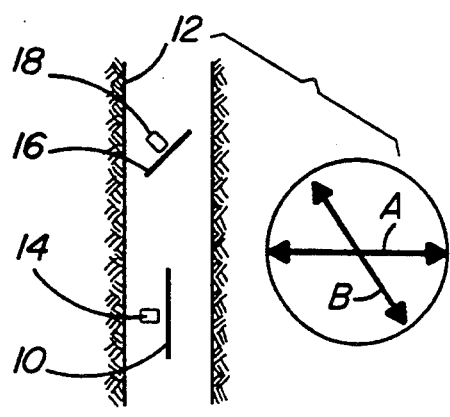
Figure 1C:
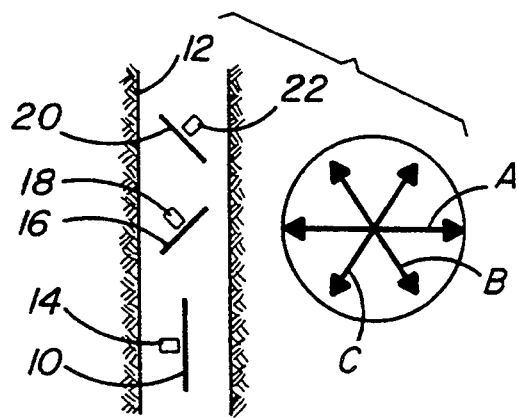

Referring to FIG. 1, diagram (a) illustrates the orientation A of stress relief when a single slot 10 is cut axially into the wall of a borehole 12. The corresponding strain deformation may be measured by placing a suitable strain sensor 14 adjacent the center of slot 10. Diagram (b) illustrates the orientations A and B of stress relief when an additional slot 16 is cut at an angle of 45° to the axis of the borehole. The corresponding strain deformation may be similarly measured by placing a strain sensor 18 adjacent the center of the slot 16. Diagram (c) illustrates the orientations A, B and C of stress relief when an additional 45° slot 20 is cut after rotation of the instrument by 180° from the first two slots. In order to arrive at the minimum required number of angles, the three-angle cutting procedure is repeated at different axial borehole rotations, preferably but not exclusively, at the three rotational angles of 60°±10° and 120°±10° from the rotational angles of first slot series. A graphic representation is given in FIG. 2. Sequence (a) illustrates the axial slots at the top and the bottom of the borehole after cutting the first series of axial and 45° slots. Sequence (b) illustrates axial slots at 60° and 240° from the top of the borehole after cutting the second series of axial and 45° slots. Sequence (c) illustrates the axial slots at 120° and 300° from the top of the borehole after cutting the third series of axial and 45° slots.

Referring to FIGS. 3a and 3b, the apparatus is contained in a tubular main housing 30, which is adapted to be inserted, and to be maintained in position by means of hydraulic jacks 32, in a, preferably but not exclusively, "H" diamond drill borehole (not shown) at a depth of up to 25 meters.

The stress relief mechanisms within the apparatus are divided into two sections, one to create and measure the strain perpendicular to an axial slot, referred to as the axial mechanism 34, and one to create and measure the strain perpendicular to a slot angled at 45° to the borehole axis, referred to as the angular mechanism 36.

The axial mechanism 34 is comprised of a tangential strain sensor assembly 38, similar but not exclusively identical, to the strain sensor of the Slotter, which is pressed by means of a hydraulic jack 40 or other device against the wall of the borehole in such a way that it is located within approximately 3 mm from, in the center of, and perpendicular to the slot to be cut. The axial mechanism is further comprised of a slot cutting device which consists of a 75 to 80 mm diameter, 0.8 to 1.0 mm thick diamond impregnated cutting wheel 42 attached to a motor 44 in such a way that it allows the cutting of a radial slot approximately 25 mm deep and up to 75 mm in length into the borehole wall parallel to the borehole axis. The motor is mounted on a wedge assembly 46 or other device which is operated by a hydraulic or electric motor 48 to move the cutting wheel against the borehole wall. The deformation of the rock material adjacent and normal to the slot is measured with the strain sensor while the slot cutting is taking place. The procedure is deemed terminated when there is no longer any deformation registered while the slot is being cut. The deformation is measured directly in micro strains.

The angular mechanism 36 is similar to the axial mechanism, however with the difference that it comprises a tangential strain sensor assembly 50 which is mounted in such a way that it allows the measurement of the deformation of the rock in the center of, and perpendicular to a radial slot to be cut at an angle of 45° to the borehole axis. The slot cutting device is similar to the axial mechanism with the difference that it comprises a cutting wheel 52 which is attached to the motor in such a way that it allows the cutting of a radial slot approximately 25 mm deep and up to 75 mm in length into the borehole wall at an angle of about 45° to the borehole axis. The cutting and measurement procedure is similar to that of the axial.

To obtain the minimum number of deformation measurements at independent angles—with sufficient redundancy—to solve for the three stress tensors, $\sigma 1$, $\sigma 2$ and $\sigma 3$ the preferred overall test procedure is the following:

The apparatus is inserted into the horizontal or sub horizontal "H" size borehole to the appropriate depth.

The first axial and angular slots are cut at the top of the borehole.

The apparatus is then rotated in the borehole by 180° and another axial and angular slot is cut at the bottom of the borehole.

Figure 2A:
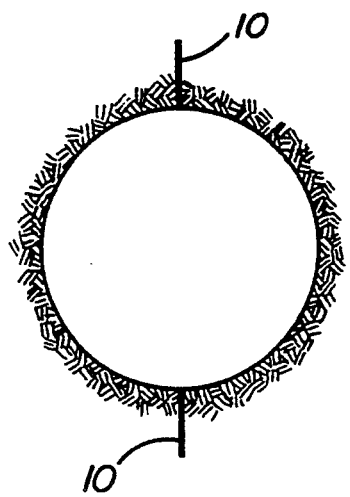
FIG. 2 illustrates a preferred sequence of slot cutting.
Figure 2B:
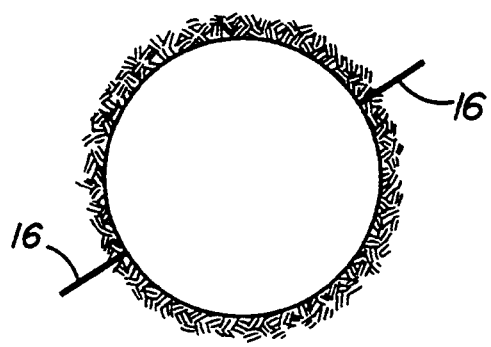
Figure 2C:
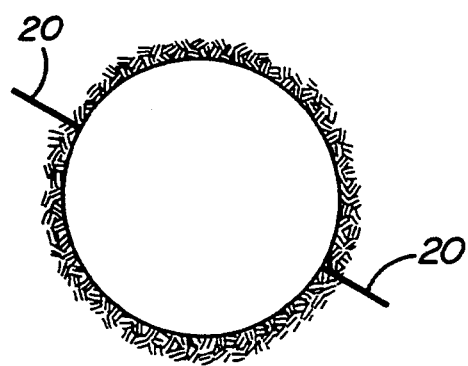

The apparatus is advanced 10 cm deeper into the borehole and the above procedures are repeated at 60° and 240° respectively from the top of the borehole (sequence 2, FIG. 2).

The apparatus is advanced 10 cm deeper into the borehole and the above procedures are repeated at 120° and 300° respectively from the top of the borehole (sequence 3, FIG. 2).

Although the invention has been disclosed with reference to a preferred embodiment, it is to be understood that it is not limited to such embodiment and that other alternatives, within the scope of the following claims, are also envisaged.

We claim:

1. A method for measuring the three dimensional stress in rock surrounding a borehole comprising the steps of:
   a) cutting at least three slots into the wall of a borehole at different angles relative to a borehole axis to effect stress relaxation and strain deformations which are representative of the stresses normal to respective slots; and
   b) measuring respective strain deformations adjacent to the at least three slots that are being cut into the borehole wall with stress sensors so as to determine the three dimensional stress field surrounding the borehole from measurements in a single borehole.

2. A method for measuring the three dimensional stress in rock surrounding a borehole comprising the steps of:
   a) cutting at least three slots into the wall of a borehole at different angles relative to a borehole axis to effect stress relaxation and strain deformations which are representative of the stresses normal to angle of the respective slots; and
   b) measuring the respective strain deformations adjacent to the at least three slots that are being cut into the borehole wall with stress sensors to determine the three dimensional stress field surrounding the borehole from measurements in a single borehole, wherein cutting of the slots is done by inserting into the borehole an instrument having a first device for cutting a first axial slot in the wall of the borehole and a second device for cutting a second slot at an angle of about 45° to the axis of the borehole, and then after axial rotation of the instrument cutting another slot which is oriented at about 325° relative to the axial slot and perpendicular to the former angular slot, thus creating a series of three slots of independent angles, and in order to arrive at the minimum required number of angles, repeating the three-angle cutting procedure at different axial borehole rotations.

3. A method as defined in claim 2, wherein the method for measuring is repeated at rotational angles of 60°±10° and 120°±10° with respect to the borehole axis from the first axial slot.

4. An apparatus for measuring the three dimensional stress in rock surrounding a borehole comprising:
   a) a tubular main housing inserted and maintained in position in a borehole during measurement;
   b) a first stress relief mechanism comprising a first slot cutting device for cutting a first axial slot into the borehole wall parallel to a borehole axis, a first strain sensor assembly adjacent to the center of the first slot to measure deformation of the rock normal to the first axial slot while the first axial slot cutting is taking place, and means for moving the first axial slot cutting device against the borehole wall; and
   c) a second stress relief mechanism comprising a second slot cutting device for cutting a second slot into the borehole wall at an angle of about 45° to borehole axis, a second strain sensor assembly adjacent to the center of said 45° slot to measure deformation of the rock material normal to said 45° slot while the second slot cutting is taking place, and means for moving the second slot cutting device against the borehole wall.

* * * * *